(12) United States Patent
Kang (10) Patent No.: US 9,519,968 B2
(45) Date of Patent: Dec. 13, 2016

(54) CALIBRATING VISUAL SENSORS USING HOMOGRAPHY OPERATORS

(71) Applicant: HEWLETT-PACKARD DEVELOPMENT COMPANY, L.P., Houston, TX (US)

(72) Inventor: Jinman Kang, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 856 days.

(21) Appl. No.: 13/713,036

(22) Filed: Dec. 13, 2012

(65) Prior Publication Data

US 2014/0168367 A1 Jun. 19, 2014

(51) Int. Cl.
*H04N 5/225* (2006.01)
*G06T 7/00* (2006.01)

(52) U.S. Cl.
CPC ..... *G06T 7/002* (2013.01); *G06T 2207/10012* (2013.01)

(58) Field of Classification Search
CPC ........... G06T 2207/10012; G06T 7/002; G06T 7/0018; H04N 13/0425; H04N 13/0246
USPC ......................................................... 348/46
See application file for complete search history.

(56) References Cited

U.S. PATENT DOCUMENTS

| 5,917,937 | A * | 6/1999 | Szeliski et al. ............... 382/154 |
| 6,789,039 | B1 | 9/2004 | Krumm |
| 6,985,175 | B2 | 1/2006 | Iwai |
| 7,023,473 | B2 | 4/2006 | Iwai |
| 7,050,085 | B1 | 5/2006 | Park |
| 7,068,303 | B2 | 6/2006 | Zhang |
| 7,155,030 | B2 | 12/2006 | Kim |
| 7,671,891 | B2 | 3/2010 | Fitzgibbon |
| 7,809,194 | B2 | 10/2010 | Zhang |
| 7,953,271 | B2 | 5/2011 | Gu |
| 8,059,916 | B2 | 11/2011 | Jaynes |
| 8,977,038 | B2 * | 3/2015 | Tian et al. ..................... 382/154 |
| 2004/0155965 | A1 * | 8/2004 | Jaynes et al. ................. 348/189 |
| 2004/0222987 | A1 * | 11/2004 | Chang et al. ................. 345/419 |
| 2005/0256395 | A1 * | 11/2005 | Anabuki et al. .............. 600/414 |
| 2008/0031514 | A1 | 2/2008 | Kakinami |
| 2008/0192017 | A1 | 8/2008 | Hildebrandt |
| 2009/0153669 | A1 * | 6/2009 | Kim ....................... G06T 7/002 348/187 |
| 2010/0085425 | A1 * | 4/2010 | Tan ................................ 348/54 |
| 2010/0172567 | A1 | 7/2010 | Prokoski |
| 2010/0245684 | A1 * | 9/2010 | Xiao et al. .................... 348/745 |
| 2011/0176007 | A1 * | 7/2011 | Ding et al. .................... 348/189 |
| 2011/0205341 | A1 | 8/2011 | Wilson |
| 2012/0105591 | A1 | 5/2012 | Kim |

(Continued)

OTHER PUBLICATIONS

Zhengyou Zhang, Technical Report MSR-TR-98-71, A Flexible New Technique for Camera Calibration, Dec. 1998 (22 pages).

(Continued)

*Primary Examiner* — Eileen Adams
(74) *Attorney, Agent, or Firm* — Trop, Pruner & Hu, P.C.

(57) ABSTRACT

A plurality of homography operators define respective mappings between pairs of coordinate spaces, wherein the coordinate spaces include a coordinate space of a first visual sensor, a virtual coordinate space, and a coordinate space of a second visual sensor. Calibration between the first and second visual sensors is provided using the plurality of homography operators.

21 Claims, 6 Drawing Sheets

(56) References Cited

U.S. PATENT DOCUMENTS

| | | | |
|---|---|---|---|
| 2013/0010079 A1* | 1/2013 | Zhang et al. | 348/47 |
| 2013/0321589 A1* | 12/2013 | Kirk et al. | 348/48 |
| 2014/0002445 A1* | 1/2014 | Xiong et al. | 345/419 |
| 2014/0168378 A1* | 6/2014 | Hall | 348/47 |

OTHER PUBLICATIONS

Zhengyou Zhang, Flexible Camera Calibration by Viewing a Plane From Unknown Orientations, 1999 (8 pages).

Roger Y. Tsai, IEEE Journal of Robotics and Automation, vol. RA-3, No. 4, Aug. 1987, A Versatile Camera Calibration Technique for High-Accuracy 3D Machine Vision Metrology Using Off-the-Shelf TV Cameras and Lenses (22 pages).

Daniel Herrera C., et al., Short Papers, IEEE Transactions on Pattern Analysis and Machine Intelligence, vol. 34, No. 10, Oct. 2012, Joint Depth and Color Camera Calibration with Distortion Correction (7 pages).

Wikipedia, Kinect dated on or before Nov. 29, 2012 (15 pages).

Website: http://docs.opencv.org—Camera calibration With OpenCV dated on or before Nov. 29, 2012 (14 pages).

Devin Coldewey, http://techcrunch.com—New Samsung Sensor Captures Both Light and Depth Data, Feb. 29, 2012 (2 pages).

\* cited by examiner

CALIBRATING VISUAL SENSORS USING HOMOGRAPHY OPERATORS

BACKGROUND

A visual sensor is a sensor that can capture visual data associated with a target. The visual data can include an image of the target or a video of the target.

A cluster of heterogeneous visual sensors (different types of visual sensors) can be used for certain applications. Visual data collected by the heterogeneous sensors can be combined and processed to perform a task associated with the respective application.

BRIEF DESCRIPTION OF THE DRAWINGS

Some embodiments are described with respect to the following figures.

DETAILED DESCRIPTION

Examples of applications in which clusters of heterogeneous sensors can be used include object detection, object tracking, object recognition, object classification, object segmentation, object capture and reconstruction, optical touch, augmented reality presentation, or other applications. Object detection can refer to detecting presence of an object in captured visual data, which can include an image or video. Object tracking can refer to tracking movement of the object. Object recognition can refer to identifying a particular object, such as identifying a type of the object, identifying a person, and so forth. Object classification can refer to classifying an object into one of multiple classes or categories. Object segmentation can refer to segmenting an object into multiple segments. Object capture and construction can refer to capturing visual data of an object and constructing a model of the object.

Optical touch can refer to recognizing gestures made by a user's hand, a stylus, or other physical artifact that are intended to provide input to a system. The gestures are analogous to gestures corresponding to movement of a mouse device or gestures made on a touch-sensitive display panel. However, optical touch allows the gestures to be made in three-dimensional (3D) space or on a physical target that is not configured to detect user input.

Augmented reality presentation can refer to a presentation of a physical, real-world environment that is augmented by additional information, including audio data, video data, image data, text data, and so forth. In augmented reality, the visual sensor (or a cluster of visual sensors) can capture visual data of a physical target. In response to recognition of the captured physical target, an augmented reality presentation can be produced. For example, the physical target can be a picture in a newspaper or magazine, and the capture of the picture can cause an online electronic game to start playing. The given picture in the newspaper or magazine can be a game character, an advertisement, or other information associated with the online electronic game. The augmented reality presentation that is triggered can include the visual data of the captured physical target, as well as other data (e.g. game environment) surrounding the captured visual data.

Use of heterogeneous visual sensors (different types of visual sensors) in a cluster can allow for the capture of richer and more robust information for the various applications discussed above or other applications. The different visual sensors can have corresponding different desirable features. For example, some visual sensors may be less sensitive to interference from visual content projected by a projector. More specifically, an infrared (IR) camera may be less sensitive to interference caused by projected content from a projector. However, an IR image captured by an IR camera may not have sufficient resolution to perform object recognition, classification, or identification. On the other hand, a high-resolution camera (also referred to as a "color-space camera") that can capture visual data in a visible color space (such as the red-green-blue or RGB color space or another color space) may provide captured visual data with higher resolution content that can be more accurately processed for certain applications.

Another example of a visual sensor is a depth camera, which is relatively robust against effects due to lighting change, presence of a shadow, or dynamic background produced by a projector. However, the discriminative power of the depth camera may be less than that of other types of cameras.

To benefit from the various features offered by different types of visual sensors, the heterogeneous visual sensors can be incorporated into a cluster. The visual data collected by the heterogeneous visual sensors can be combined (or fused) and processed to perform a task associated with the respective application. However, if the visual sensors of the cluster are not properly calibrated with respect to each other, then combining the visual data collected by the visual sensors may not provide accurate results.

Figure 1:
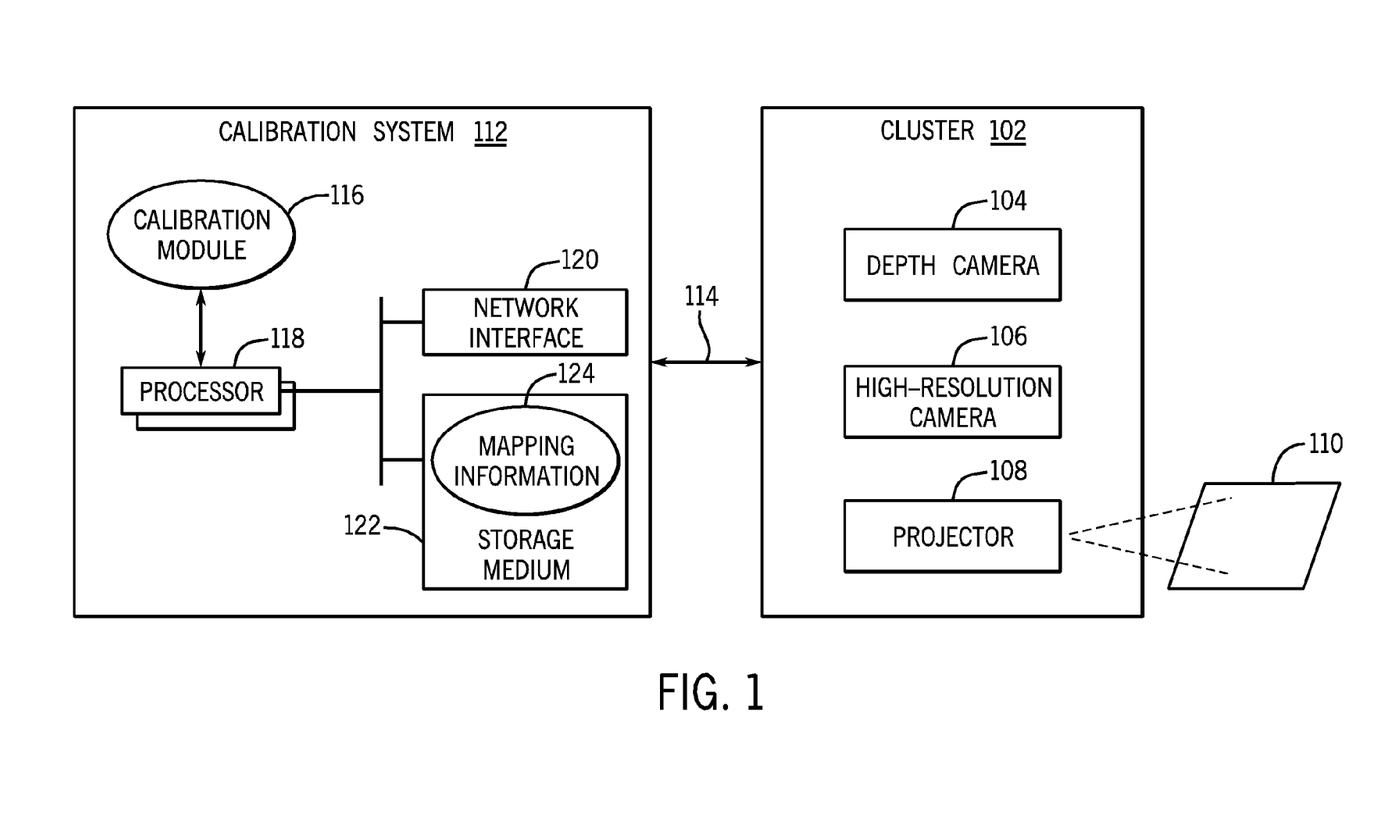
FIG. 1 is a block diagram of an example arrangement that includes a cluster of heterogeneous visual sensors and a calibration system according to some implementations.

To allow for proper operation of a cluster of heterogeneous visual sensors, a calibration procedure can be performed to calibrate the visual sensors with respect to each other. In accordance with some implementation, calibration mechanisms or techniques are provided to calibrate heterogeneous visual sensors that are part of a cluster of visual sensors. In some examples, as shown in FIG. 1, the visual sensors of a cluster 102 can include a depth camera 104, a high-resolution camera 106, and a projector 108. In other examples, other combinations of visual sensors can be used.

In some examples, the depth camera 104 can capture visual data of a physical target, where the captured visual data can include the following: three-dimensional (3D) depth information (also referred to as a "depth map"), infrared (IR) image frames, and RGB image frames (which are image frames in the RGB color space). In other examples, the depth camera 104 can produce image frames in another color space. An "image frame" refers to a collection of visual data points that make up an image. Depth information refers to a depth of the physical target with respect to the depth camera 104; this depth information represents the distance between the physical target (or a portion of the physical target) and the depth camera 104.

In some examples, the depth camera 104 can include an IR visual sensor, an RGB visual sensor, and additional sensor(s) to allow the depth camera to capture the depth information as well as an RGB image frame and IR image frame. The RGB image frame captured by a depth camera can be a relatively low-resolution image frame. In other examples, the depth camera 104 can include other combinations of visual sensors that allow the depth camera 104 to capture depth information and visual data of a physical target in a visible color space.

The high-resolution color-space camera 106 of the cluster 102 can capture a higher-resolution RGB image frame (or image frame in other color space). In the ensuing discussion, reference to "low-resolution" and "high-resolution" is in the context of relative resolutions between different visual sensors. In other words, a "high-resolution" visual sensor is able to capture visual data at a higher resolution than a "low-resolution" visual sensor.

The projector 108 projects visual data (an image or video) onto a target object 110 (e.g. a target surface or other physical object). The projector 108 receives input data, and based on the input data, the projector 108 produces output light to project the corresponding visual data onto the target object 110. Although the projector 108 is also referred to as a "visual sensor" that is part of the cluster 102, it is noted that the projector 108 differs from a traditional visual sensor in that the projector 108 cannot actively perceive information. Instead, the projector 108 projects content that is controlled by an input source. However, the projector 108 is provided as part of the cluster 102 to allow for various characteristics of the depth camera 104 to be derived for purposes of performing calibration among the visual sensors of the cluster 102, as discussed further below.

FIG. 1 also shows a calibration system 112 that is able to communicate over a link 114 with the various visual sensors of the cluster 102. The calibration system 112 includes a calibration module 116 that is able to perform calibration procedures according to some implementations for calibrating the visual sensors of the cluster 102. In some examples, the calibration module 116 can be implemented as machine-readable instructions executable on one or multiple processors 118. In other examples, the calibration system 112 can be implemented as hardware.

The calibration system 112 also includes a network interface 120 to allow the calibration system 112 to communicate over a network, such as the link 114. Also, the calibration system 112 includes a storage medium 122 for storing data and instructions.

The storage medium 122 can store mapping information 124, where the mapping information 124 relates to mappings between different pairs of the visual sensors of the cluster 102. The mapping information 124 is used to perform calibration among the visual sensors of the cluster 102.

Once the visual sensors of the cluster 102 are calibrated, the visual data captured by the respective visual sensors can be properly combined to perform various tasks, such as tasks associated with any of the applications listed above.

In accordance with some implementations, characteristics associated with the depth camera 104 can be used for deriving projective mappings for each of the visual sensors in the cluster 102. A projective mapping maps between three dimension (3D) coordinates (of the depth camera 104) and two dimensional (2D) coordinates (of another visual sensor in the cluster 102). Derivation of the projective mapping for each of the visual sensors enables the derivation of various parameters associated with each of the visual sensors. These parameters can include visual sensor geometric parameters and optical parameters (also referred to as intrinsic parameters).

Figure 2:
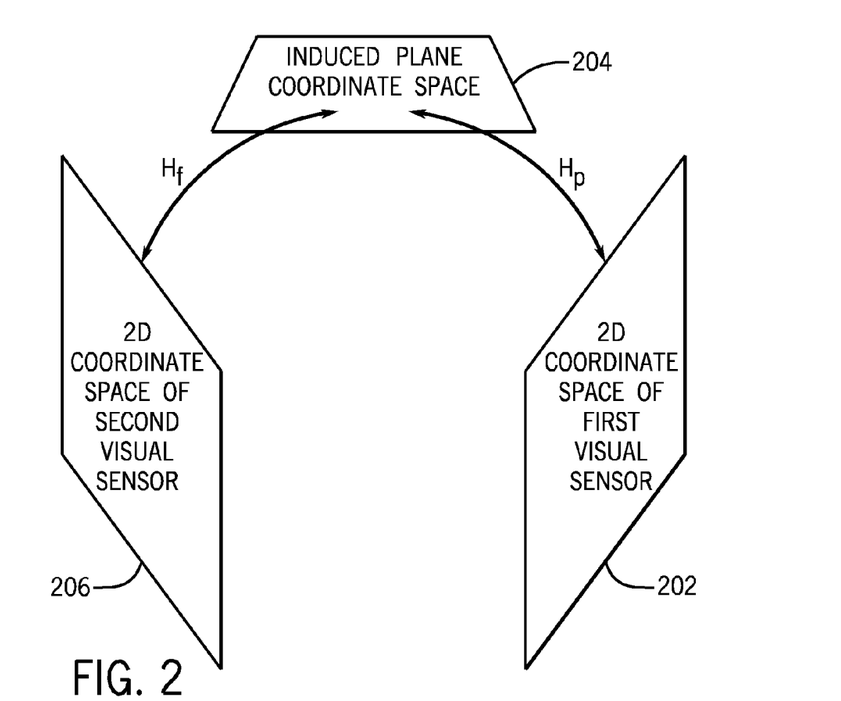
FIG. 2 illustrates various mappings between coordinate spaces according to some implementations.

Once certain parameters of each visual sensor are derived, homography mappings between each pair of visual sensors in the cluster 102 can be derived. A homography mapping is a direct 2D-to-2D mapping (a mapping between 2D coordinates of a first space and 2D coordinates of a second space). In accordance with some implementations, the homography mappings for a given pair of visual sensors of the cluster 102 are represented by respective multiple homography operators, where each homography operator defines a respective mapping between a pair of 2D coordinate spaces. For example, as shown in FIG. 2, the multiple homography operators can include a first homography operator ($H_p$) that defines a mapping between a coordinate space 202 (represented by a first plane) of a first visual sensor and a virtual coordinate space 204, which can be a coordinate space defined at an arbitrary distance from the first plane 202. In some implementations, the arbitrary distance can be an infinite distance. The virtual coordinate space is the coordinate space of an induced or virtual plane. A second homography operator ($H_f$) defines a mapping between the virtual coordinate space 204 and a coordinate space 206 (represented by a second plane) of a second virtual sensor.

Figure 3:
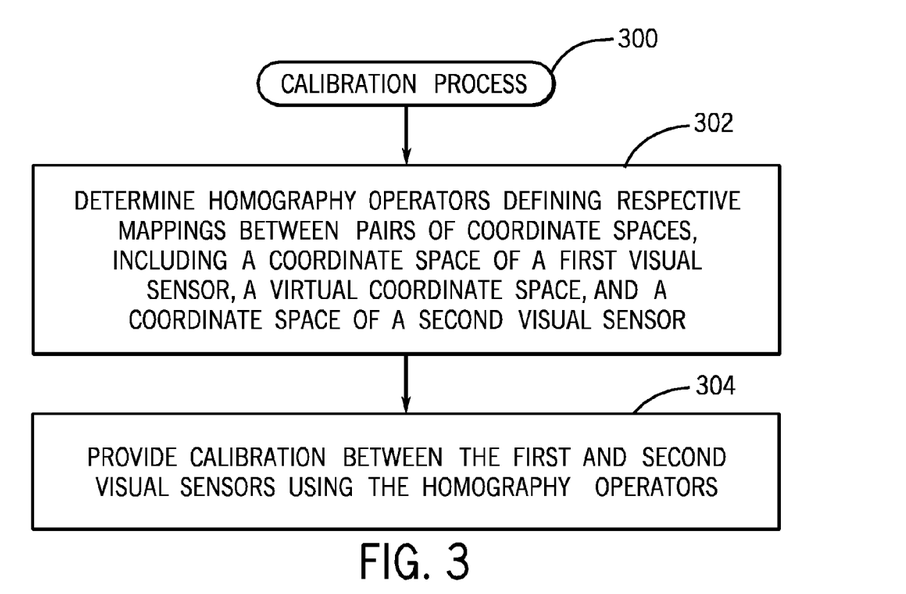
FIG. 3 is a flow diagram of a calibration process according to some implementations.

FIG. 3 is a flow diagram of a calibration process 300 according to some implementations. The calibration process 300 determines (at 302) homography operators defining respective mappings between pairs of coordinate spaces, where the coordinate spaces can include the coordinate space 202 of the first visual sensor, the virtual coordinate space 204, and the coordinate space 206 of the second visual sensor. The determination of the homography operators is based on certain parameters of the visual sensors of the cluster 102 of FIG. 1 that were derived from projective mappings between the depth camera 104 and each of the other visual sensors. Further details regarding determining the projective mappings and how parameters of visual sensors can be derived from the projective mappings are discussed further below.

The homography operators can be used to provide (at 304) calibration between the first and second visual sensors of the cluster 102. The calibration is achieved by being able to map the visual data of one of the first and second visual sensors to the coordinate space of the other of the first and second visual sensors. After the mapping is performed using the homography operators, the mapped visual data of one of the first and second visual sensors can be combined with the visual data of the other of the first and second visual sensors.

The process of FIG. 3 can be re-iterated for each other pair of visual sensors in the cluster 102 to provide a direct 2D-to-2D mapping between each such other pair of visual sensors in the cluster 102.

Figure 4:
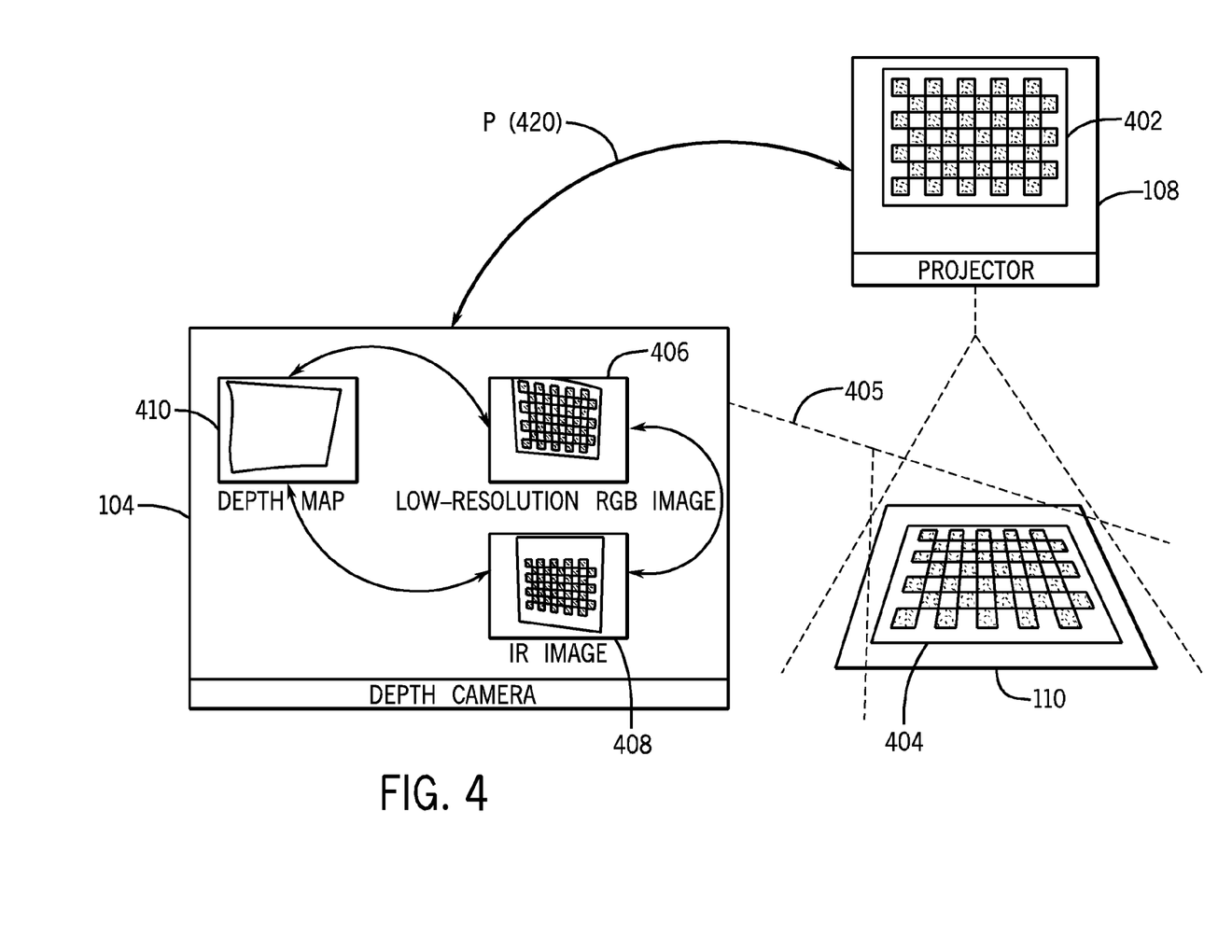
FIGS. 4 and 5 are schematic diagrams illustrating projective mappings between a depth camera and various visual sensors.

As noted above, a projective mapping between 2D and 3D coordinates can be performed to allow for derivation of geometric parameters and intrinsic parameters of a visual sensor. For example, as shown in FIG. 4, a projective mapping can be defined between the 3D coordinates of the depth sensor 104 and the 2D coordinates of the projector 108. In FIG. 4, the projector 108 is used to project a calibration pattern 402 (which is a known or predefined pattern) onto a 3D target object 110. In some examples, the 3D target object 110 can be a plane that is in 3D space. The calibration pattern 402 in the example of FIG. 4 is a checkerboard pattern.

The depth camera 104 is able to capture (at 405) a calibration pattern image 404 that is projected onto the target object 110 by the projector 108. The depth camera 104 is able to capture a low-resolution RGB image 406 (or image in another color space) of the projected calibration pattern image 404 and an IR image 408 of the projected calibration pattern image 404. In addition, the depth camera 104 can also derive a depth map 410 based on the captured calibration pattern image 404, where the depth map 410 specifies depths of corresponding portions of the calibration pattern image 404 from the depth camera 104.

The visual data (of the projected calibration pattern image 404) captured by the depth camera 104 is in a 3D space (defined by 3D coordinate), while the calibration pattern 402 projected by the projector 108 is in 2D space (defined by 2D coordinates). The projective mapping 420 (represented by P) between the 3D coordinates of the depth camera 104 and the 2D coordinates of the projector 108 is defined by Eq. 1 below:

$$x = PX, \qquad \text{(Eq. 1)}$$

where x represents 2D coordinates and X represents 3D coordinates. More specifically, Eq. 1 can be written as $$\begin{bmatrix} u \\ v \\ 1 \end{bmatrix} = z_c \cdot K \, [R \ t] \begin{bmatrix} x_w \\ y_w \\ z_w \\ 1 \end{bmatrix}, \qquad \text{(Eq. 2)}$$

where $x = [u \ v \ 1]^T$ represents 2D coordinates, $X = [x_w \ y_w \ z_w \ 1]^T$ represents 3D coordinates, $z_c$ is an arbitrary scale (having a predefined value), K represents intrinsic parameters, R represents extrinsic rotation parameters, and t represents extrinsic translation parameters. The intrinsic parameters K are defined as follows:

$$K = \begin{bmatrix} f_x & s & u_0 \\ 1 & f_y & v_0 \\ 1 & 1 & 1 \end{bmatrix}, \qquad \text{(Eq. 3)}$$

where $f_x$, $f_y$ represent focal lengths of a lens of the visual sensor, $u_0$, $v_0$ represent an optical center along an optical axis of the visual sensor, and s is a skew coefficient that represents skew distortion of the visual sensor.

The extrinsic rotation parameters (R) and extrinsic translation parameters (t) are part of the geometric parameters of a visual sensor. The rotation parameters can define the pan, tilt, and yaw of a visual sensor in geometric space. The translation parameters can define a translational position of the visual sensor in geometric space.

Deriving the projective matrix (P) involves computing the intrinsic parameters (K) and geometric parameters (R, t) of a visual sensor. As explained further below, the intrinsic parameters (K) and extrinsic rotation parameters (R) can be used to produce a homography operator for mapping between 2D coordinates of respective visual sensors. In the example of FIG. 4, deriving the projective matrix (P) involves computing the intrinsic parameters (K) and geometric parameters (R, t) of the projector 108.

Figure 5:
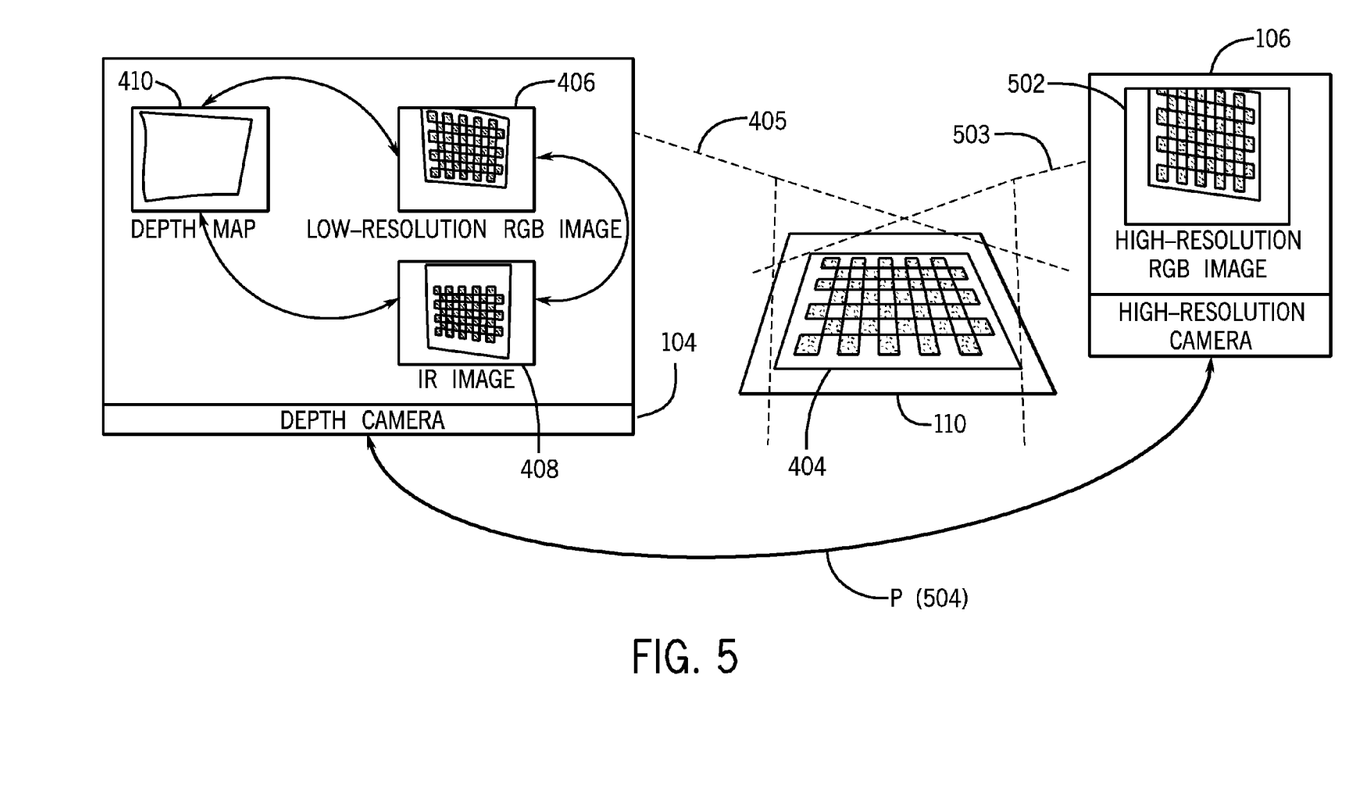
Figure 6:
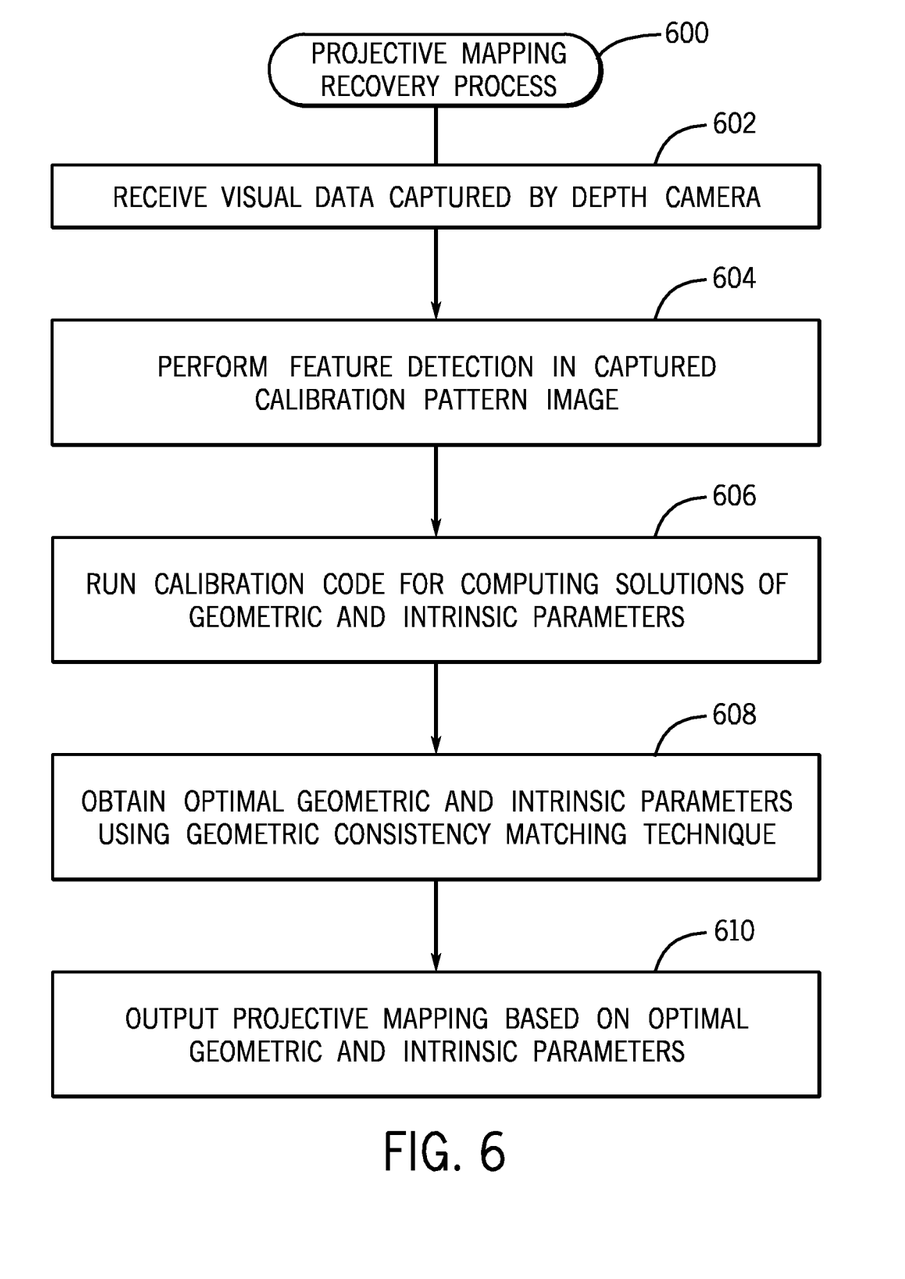
FIG. 6 is a flow diagram of a projective mapping recovery process according to some implementations.

FIG. 5 shows another example relating to a projective mapping between the depth camera 104 and the high-resolution camera 106. Each of the depth camera 104 and high-resolution camera 106 is able to capture the projected calibration pattern image 404 projected onto the target object 110 by the projector 108 (not shown in FIG. 5). The high-resolution camera 106 captures (at 503) a high-resolution RGB image 502 (or image in other color space) of the projected calibration pattern image 404. The high-resolution RGB image 502 is an image in 2D space (defined by 2D coordinates). A projective mapping 504 can be defined between the 3D coordinates of the depth camera 104 and the 2D coordinates of the high-resolution RGB image 502 captured by the high-resolution camera 106, based on Eqs. 1-3 discussed above. Deriving the projective mapping 504 involves computing the intrinsic parameters (K) and geometric parameters (R, t) of the high-resolution camera 106, which can be used to derive a homography operator for mapping between 2D coordinates of respective visual sensors FIG. 6 is a flow diagram of a process 600 for recovering a projective matrix (P). The process of FIG. 6 can be performed by the calibration system 112 (more specifically the calibration module 116) of FIG. 1, for example. The process 600 receives (at 602) visual data captured by the depth camera 104 of the calibration pattern image 404 (FIG. 4 or 5) on the target object 110.

The process 600 next performs (at 604) feature detection to identify features of the captured calibration pattern image 404. In the example of FIG. 4 or 5, feature detection involves identifying features of the checkerboard pattern of the example calibration pattern image 404.

Next, calibration code can be run (at 606) for computing the geometric parameters (R and t) and intrinsic parameters (K) of the respective visual sensor (projector 108 in FIG. 4 and high-resolution camera 106 in FIG. 5). In some implementations, the calibration code can be a CameraCalibration program, which is an open source program available from the OpenCV (Open Source Computer Vision) library of programming functions. An example of the CameraCalibration program is described in OpenCV, "Camera Calibration with OpenCV," provided by the OpenCV organization.

The inputs to the calibration code include (1) the 2D coordinates of the image (402 in FIG. 4 or 502 in FIG. 5) associated with the visual sensor for which the projective mapping is to be derived, and (2) the 3D coordinates of the calibration pattern image 404 as captured by the depth camera 104. The calibration code can produce multiple possible solutions of the geometric parameters and intrinsic parameters of the visual sensor. The geometric and intrinsic parameters of the multiple possible solutions are referred to as candidate parameters.

The optimal geometric parameters and intrinsic parameters (from among the multiple possible solutions) are obtained (at 608) by minimizing re-projection errors using a geometric consistency matching technique such as a RANSAC (RANdom Sample Consensus) technique. The RANSAC technique chooses a small set (e g minimum set) of the candidate samples (of parameters) and performs parameter estimation, and then re-projects the remaining candidate samples that exclude the chosen small set using the estimated parameters from the chosen small set of candidate samples. Re-projecting the remaining candidate samples refers to deriving the calibration pattern image based on the remaining parameters. The features of the re-projected calibration pattern image are compared to the features of the actual calibration pattern image, and an error score can be computed based on the comparison. The foregoing process is re-iterated for other randomly chosen small sets of candidate samples, and the estimated parameters of the candidate samples associated with the best score can be chosen as the optimal set of geometric and intrinsic parameters of the visual sensor.

Although specific examples for determining geometric and intrinsic parameters are provided above, it is noted that in other implementations, other techniques for determining geometric and intrinsic parameters of a visual sensor can be used.

The process 600 of FIG. 6 outputs (at 610) the projective mapping (P) based on the derived optimal geometric and intrinsic parameters. The process 600 can be re-iterated for each of the visual sensors of the cluster 102 (other than the depth camera 104) to use the depth sensor information for deriving geometric and intrinsic parameters of the corresponding visual sensors.

The direct 2D-to-2D mapping between a pair of visual sensors can be represented by a homography. The homography relates the pixel coordinates in two images (corresponding to two visual sensors). A homography (H) (also referred to as a homography operator) can be represented by a 3-x-3 matrix, generally of the form:

$$H = \begin{bmatrix} H_{11} & H_{12} & H_{13} \\ H_{21} & H_{22} & H_{23} \\ H_{31} & H_{32} & H_{33} \end{bmatrix}. \quad \text{(Eq. 4)}$$

As discussed further below, the homography (H) can be used to map from the 2D coordinates in a first space (of a first visual sensor) to 2D coordinates in a second space (of a second visual sensor). A homography is effectively a plane-to-plane mapping. Traditionally, a homography can be represented as follows:

$$H = K'(R - tn^T/d)K^{-1}, \quad \text{(Eq. 5)}$$

where K' is the intrinsic matrix (including intrinsic parameters) of the first visual sensor, $K^{-1}$ is the inverse of the intrinsic matrix (including intrinsic parameters) of the second visual sensor, R and t are rotation and translation parameters, respectively, and $n^T/d$ represents a world plane induced by the homography. Each of K' and $K^{-1}$ contains the content of Eq. 3 above (except that $K^{-1}$ is an inverted version of K).

It can be difficult to characterize the world plane in a real application. Instead of above approach, the proposed approach for deriving the homography according to some implementations uses following:

$$H_p = K'(K(R - t/d_\infty))^{-1}, \quad \text{(Eq. 6)}$$

where $H_p$ is an initial homography operator characterized by the projective mapping (more specifically, K' and K) of the first and second visual sensors, R represents the extrinsic rotation parameters of the second visual sensor, and $d_\infty$ is an arbitrary distance (e.g. infinite distance or other arbitrary distance) between an induced plane and the destination visual sensor. Note that K', K, and R are derived using respective iterations of the projective mapping recovery process 600 of FIG. 6. The induced plane is represented as 204 in FIG. 2, and the arbitrary distance $d_\infty$ is the distance between the plane 202 (representing the 2D coordinates of the destination visual sensor) and the induced plane 204.

By setting $d_\infty$ to the induced plane as an infinite distance, the value of $t/d_\infty$ in Eq. 6 becomes zero, such that the homography operator $H_p$ can be derived based on K', K, and R.

In some examples, the mapping by $H_p$ in Eq. 6 can have one or some combination of the following characteristics:
 1. The mapping by $H_p$ is depth invariant (does not vary with depth between a visual sensor and the target object whose image is captured) due to the infinite distance ($d_\infty$) assumption.
 2. The mapping by $H_p$ is scale invariant (does not vary with scale of the visual sensor).
 3. The mapping by $H_p$ is rotation and translation invariant (does not vary with rotation and translation of the visual sensor).

As depicted in FIG. 2, the homography operator $H_p$ provides a mapping between the 2D coordinate space 202 of the destination (first) visual sensor and the coordinate space 204 of the induced plane. Another homography operator $H_f$ can be used to provide a mapping between the 2D coordinate space 204 of the induced plane and the 2D coordinate space 206 of the source (second) visual sensor.

More generally, a homography that provides the 2D-to-2D mapping between coordinate spaces of two visual sensors is a multi-step homography that can include multiple homography operators.

The mappings using a multi-step homography (including $H_p$ and $H_f$) according to some implementations can be represented as follows:

$$x' = H_p x = \begin{bmatrix} H_{p11} & H_{p12} & H_{p13} \\ H_{p21} & H_{p22} & H_{p23} \\ H_{p31} & H_{p32} & H_{p33} \end{bmatrix} \begin{bmatrix} u \\ v \\ 1 \end{bmatrix} = \quad \text{(Eq. 7)}$$

$$\left( \frac{H_{p11}u + H_{p12}v + H_{p13}}{H_{p31}u + H_{p32}v + H_{p33}}, \frac{H_{p21}u + H_{p22}v + H_{p23}}{H_{p31}u + H_{p32}v + H_{p33}} \right) = (u', v'),$$

$$x'' = H_f x' = \begin{bmatrix} H_{f11} & H_{f12} & H_{f13} \\ H_{f21} & H_{f22} & H_{f23} \\ H_{f31} & H_{f32} & H_{f33} \end{bmatrix} \begin{bmatrix} u' \\ v' \\ 1 \end{bmatrix} = \quad \text{(Eq. 8)}$$

$$\left( \frac{H_{f11}u' + H_{f12}v' + H_{f13}}{H_{f31}u' + H_{f32}v' + H_{f33}}, \sqrt{[No} \frac{H_{f21}u' + H_{f22}v' + H_{f23}}{H_{f31}u' + H_{f32}v' + H_{f33}} \right) =$$

$$(u'', v''),$$

where x' corresponds to an intermediate mapped coordinate space (and more specifically the virtual coordinate space 204 of FIG. 2) based on $H_p$, and x" corresponds to a final mapped coordinate space based on $H_f$.

Figure 7:
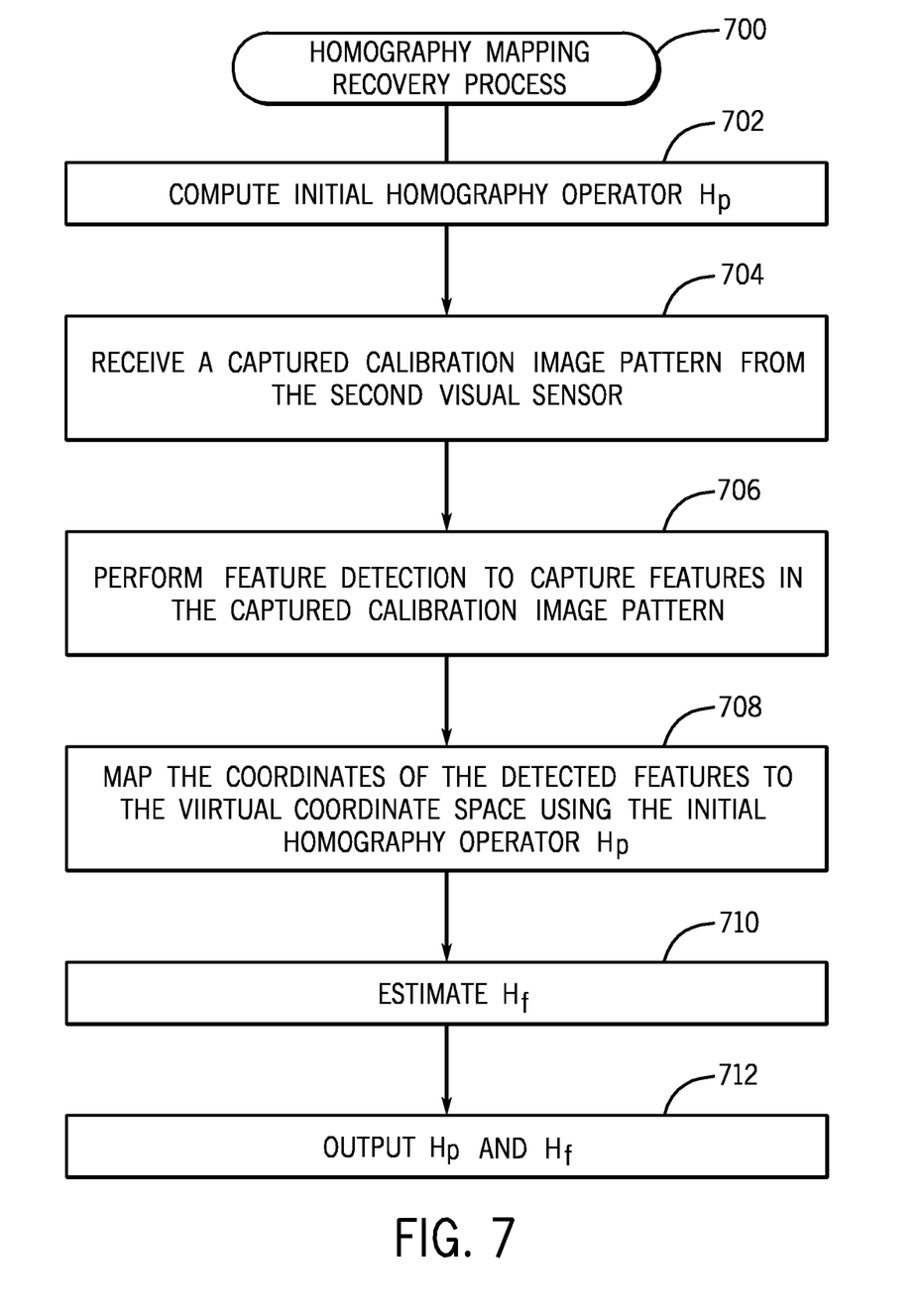
FIG. 7 is a flow diagram of a homography mapping recovery process according to some implementations.

FIG. 7 is a flow diagram of a homography mapping recovery process 700 according to some implementations, which can be performed by the calibration module 116 in the calibration system 112 of FIG. 1, for example. Note that the initial homography $H_p$ can be derived based on Eq. 6 and the derived parameters K', K and R. The process 700 of FIG. 7 is used to derive the final homography $H_f$.

The process 700 computes (at 702) the initial homography $H_p$ based on the parameters K', K and R computed using respective iterations of the projective mapping recovery process 600 of FIG. 6. The process 700 receives (at 704) a captured calibration image pattern (e.g. 404 in FIG. 4 or 5), as captured by the second visual sensor. The process then performs (at 706) feature detection to capture features in the captured calibration image pattern (such as a captured checkerboard pattern).

Next, the initial homography operator $H_p$ is used to map (at 708) the coordinates of the detected features to the virtual coordinate space 204 (FIG. 2). The final homography operator $H_f$ is then estimated (at 710) using the mapped features with corresponding feature points. As noted above in Eq. 8, x"=$H_f$x'. The mapping of the coordinates of the detected features to the virtual coordinate space 204 in task 708 produces coordinates x'. The coordinates x" are the coordinates of the captured calibration pattern (as received at 704). Since x" and x' are known, the final homography operator $H_f$ can be estimated at 710.

The process 700 then outputs (at 712) the homography operators H$_p$ and H$_f$ to define the mapping between the pair of the first and second visual sensors. The process 700 can then be re-iterated for other pairs of visual sensors in the cluster 102 of FIG. 1, to define homography operators H$_p$ and H$_f$ for these other pairs of visual sensors.

Once the mappings between pairs of visual sensors are derived according to some implementations, the mappings can be used for calibrating the visual sensors in the cluster 102 such that the visual data collected by the visual sensors in the cluster 102 can be combined for use in a task of a corresponding application.

Various tasks described herein can be performed by machine-readable instructions (such as machine-readable instructions of the calibration module 116 of FIG. 1), which can be loaded for execution on a processor or processors (such as 118 in FIG. 1). A processor can include a microprocessor, microcontroller, processor module or subsystem, programmable integrated circuit, programmable gate array, or another control or computing device.

Data and instructions can be stored in respective storage devices, which can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
    determining, by a system having a processor, a plurality of homography operators defining respective mappings between pairs of coordinate spaces, wherein the coordinate spaces include a coordinate space of a first visual sensor, a virtual coordinate space, and a coordinate space of a second visual sensor, the plurality of homography operators comprising a first homography operator providing a 2D-to-2D mapping between the coordinate space of the first visual sensor and the virtual coordinate space, and a second homography operator providing a 2D-to-2D mapping between the coordinate space of the second visual sensor and the virtual coordinate space, the first visual sensor and the second visual sensor being heterogeneous sensors of different types and different resolutions;
    using a depth camera to capture a calibration pattern projected by a projector;
    determining parameters of the first and second visual sensors based on the calibration pattern captured by the depth camera;
    determining, by the system, the first and second homography operators using the parameters of the first and second visual sensors; and
    providing, by the system, calibration between the first and second visual sensors using the plurality of homography operators.

2. The method of claim 1, wherein the parameters of the first and second visual sensors include intrinsic parameters of the first and second visual sensors.

3. The method of claim 1, wherein determining the parameters of the first and second visual sensors comprises determining a mapping between a coordinate space of the depth camera and the coordinate space of each of the first and second visual sensors.

4. The method of claim 3, wherein the coordinate space of the depth camera is a three-dimensional coordinate space, and the coordinate space of each of the first and second visual sensors is a two-dimensional coordinate space.

5. The method of claim 1, wherein the first visual sensor is a color-space camera to capture visual data in a color space, the method further comprising:
    using the color-space camera to capture the calibration pattern projected by the projector,
    wherein determining the parameters of the color-space camera is further based on the calibration pattern captured by the color-space camera.

6. The method of claim 1, wherein determining the first homography operator is based on projective mapping between the depth camera and each of the first and second visual sensors.

7. The method of claim 6, wherein determining the second homography operator comprises:
    capturing, by the second visual sensor, a calibration pattern;
    detecting features of the calibration pattern, the features associated with coordinates in the coordinate space of the second visual sensor;
    mapping coordinates of the detected features to the virtual coordinate space using the first homography operator; and
    deriving the second homography operator based on the mapped coordinates and the coordinates in the coordinate space of the second visual sensor.

8. The method of claim 1, wherein the projector projects the calibration pattern onto a target surface, and the depth camera captures the calibration pattern projected by the projector onto the target surface.

9. The method of claim 1, wherein the virtual coordinate space is of a common virtual plane spaced apart from each of the first and second visual sensors.

10. The method of claim 9, wherein the common virtual plane is at an infinite distance from each of the coordinate spaces of the first and second visual sensors.

11. An article comprising at least one non-transitory machine-readable storage medium storing instructions that upon execution cause a system to:
    determine a 2D-to-2D mapping, represented by a first homography operator, between a coordinate space of a first visual sensor and a virtual coordinate space;

determine a 2D-to-2D mapping, represented by a second homography operator, between the virtual coordinate space and a coordinate space of a second visual sensor, the second visual sensor and the first visual sensor being heterogeneous sensors of different types and different resolutions;

and calibrate the first and second visual sensors of different types and different resolutions using the first and second homography operators.

12. The article of claim 11, wherein the instructions upon execution cause the system to compute the first homography operator using parameters of the first and second visual sensors.

13. The article of claim 12, wherein the parameters include intrinsic parameters of the first and second visual sensors.

14. The article of claim 12, wherein the parameters include rotation parameters of at least one of the first and second visual sensors.

15. The article of claim 12, wherein the instructions upon execution cause the system to further compute the parameters of each of the first and second visual sensors using projective mappings between a depth camera and each of the first and second visual sensors.

16. The article of claim 12, wherein the instructions upon execution cause the system to further:

compute the second homography operator using the first homography operator to map features of a captured calibration pattern to the virtual coordinate space.

17. The article of claim 11, wherein the virtual coordinate space is of a virtual plane spaced apart by an infinite distance from each of the coordinate spaces of the first and second visual sensors.

18. A system comprising:

at least one processor to:

determine a plurality of homography operators defining respective mappings between pairs of coordinate spaces, wherein the coordinate spaces include a coordinate space of a first visual sensor, a virtual coordinate space, and a coordinate space of a second visual sensor, the first visual sensor and the second visual sensor being heterogeneous sensors of different types and different resolutions, a first homography operator of the plurality of homography operators providing a 2D-to-2D mapping between the coordinate space of the first visual sensor and the virtual coordinate space, and a second homography operator of the plurality of homography operators providing a 2D-to-2D mapping between the coordinate space of the second visual sensor and the virtual coordinate space; and provide calibration between the first and second visual sensors of different types and different resolutions using the plurality of homography operators.

19. The system of claim 18, wherein the virtual coordinate space is of a virtual plane at an infinite distance from each of the coordinate spaces of the first and second visual sensors.

20. The system of claim 18, wherein the first and second visual sensors are part of a cluster of visual sensors.

21. The system of claim 20, wherein the cluster of visual sensors include a depth camera, a projector, and a color-space camera.

* * * * *